United States Patent [19]

Sarraf et al.

[11] Patent Number: 4,878,136
[45] Date of Patent: Oct. 31, 1989

[54] TRACK CROSSING DETECTOR

[75] Inventors: Raymond E. Sarraf, Westminster; Daniel R. Zaharris, Longmont, both of Colo.

[73] Assignee: MiniScribe Corporation, Longmont, Colo.

[21] Appl. No.: 244,087

[22] Filed: Sep. 14, 1988

[51] Int. Cl.[4] .......................... G11B 5/55; G11B 21/08
[52] U.S. Cl. ................................................. 360/78.04
[58] Field of Search ............... 360/78.01, 78.04, 78.09; 369/43

[56] References Cited

U.S. PATENT DOCUMENTS

| | | | |
|---|---|---|---|
| 4,096,534 | 6/1978 | Brownback | 360/78.06 |
| 4,314,291 | 2/1982 | Oda | 360/78.07 |
| 4,516,178 | 5/1985 | Lee | 360/78.04 |
| 4,682,253 | 7/1987 | Leslie | 360/77.07 |
| 4,691,152 | 9/1987 | Ell | 318/616 |

Primary Examiner—Aristotelis M. Psitos
Assistant Examiner—David L. Robertson
Attorney, Agent, or Firm—Curtis, Morris & Safford

[57] ABSTRACT

A circuit for accurately detecting the number of tracks crossed by a reading head during motion thereof across a record medium uses a state machine operation to detect track crossing transitions and to suppress the effect of noise. The head produces a signal which assumes one of four unique states in sequence as successive tracks are crossed. The circuit detects a valid track crossing when a generated next state is the correct next state for a present state indicated by the signal.

13 Claims, 2 Drawing Sheets

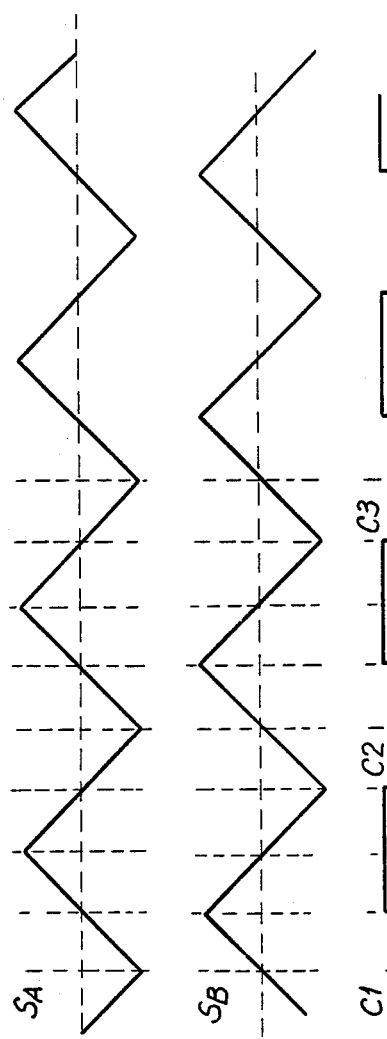
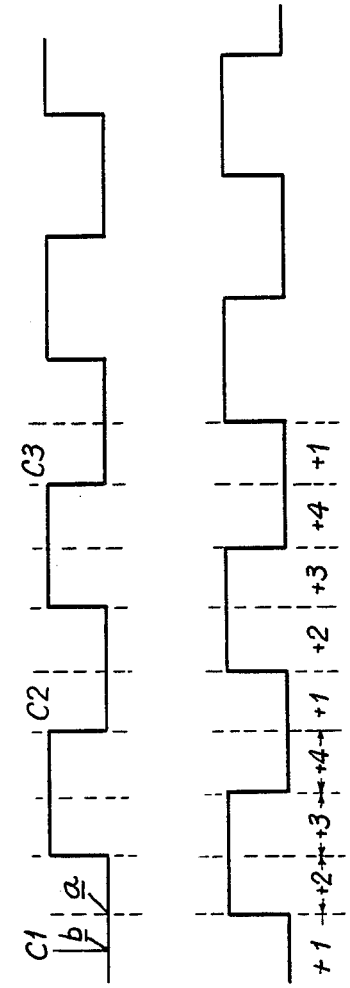
FIG. 4A
FIG. 4B
FIG. 4C
FIG. 4D
FIG. 4E
FIG. 4F

TRACK CROSSING DETECTOR

FIELD OF THE INVENTION

The present invention relates to disk drive systems and more particularly relates to a circuit for detecting a number of tracks crossed by a reading head during movement across a disk.

BACKGROUND OF THE INVENTION

In a hard or floppy disk drive system, at least one read/write head is moved across a data disk so as to be positioned over a selected one of the large number of substantially circular, concentric tracks in which data is recorded and/or reproduced. In one embodiment, a servo head is moved simultaneously across a dedicated servo disk for providing servo information to control the operation of the disk drive system. In another embodiment, embedded servo information in the data disk is read by the moving read/write head. The heads are mounted on a head actuator so as to position the read/write head at the desired track and the head actuator in turn is driven by an actuator motor.

One operation of the disk drive system is a track access operation or track seek operation in which the heads are moved across one or more tracks from an initial position to a desired track, so as to access the desired track for reading or writing data thereon. It is common for the data to be recorded such that specific portions or sectors of the data are recorded in specific ones of the tracks. Each such sector includes header data which in turn includes the respective track number, so that the read/write head, when accessing a track, can reproduce the track number, whereby the system knows at which track the read/write head is positioned. If a user wishes to access track 200 to read or write data, the system can move the read/write head until it is positioned over a track from which it reproduces the track number 200.

It is undesirable for the read/write head to have to read the track number in each track crossed during the track seek operation, as this would require a relatively long period of time during which the header data is read and the track number is extracted and compared with the desired track number. However, at the start of the track seek operation, the system knows that the read/write head is positioned at a particular track, for example at track 100, and that the servo head (if a dedicated servo disk is used) is positioned at a corresponding position on the servo disk. The system can move the read/write head from track 100 to track 200 by crossing 100 tracks, using the servo head to count tracks crossed from a servo pattern recorded on the servo disk. This significantly decreases the time required for the track seek operation. However, if the track count is inaccurate by reason of, for example, defects in the servo disk surface, the read/write head will end up positioned over the wrong track, for example track 198. It is then necessary for the system to perform at least a short track jump to track 200. Such a track jump adds significant time to the track seek operation. Therefore, it would be highly advantageous to provide a circuit for detecting the number of tracks crossed by the head during movement thereof across the disk which provides an accurate track count.

OBJECTS AND SUMMARY OF THE INVENTION

Accordingly, it is an object of the present invention to provide a circuit for detecting a number of tracks crossed which avoids the above-described difficulties of the prior art.

It is another object of the present invention to provide a circuit for detecting a number of tracks crossed by a magnetic servo head during movement thereof across a disk in a hard or floppy disk drive system.

It is yet another object of the present invention to provide a circuit for detecting a number of tracks crossed by a servo head which suppresses the effect of erroneous track-crossing detections.

It is a further object of the present invention to provide a circuit for detecting a number of tracks crossed by a servo head which utilizes state machine operation to identify an erroneous track-crossing detection.

It is still a further object of the present invention to provide a circuit for detecting a number of tracks on a dedicated servo disk crossed by a servo head which suppresses the effect of glitches produced by, for example, defects in the surface of the servo disk.

In accordance with an aspect of the present invention, a disk drive system is provided including a disk having data recorded thereon in a plurality of concentric, substantially circular tracks and a head movable across the disk and positionable at a selected one of the tracks for reading or writing data therein. In this system, a circuit for detecting a number of tracks crossed by the head during movement thereof across the disk comprises signal generating means connected to the head for generating an input signal having first, second, third and fourth ordered input states for every four tracks crossed and state machine means for outputting an output signal having first, second, third and fourth ordered output states. The input signal in its first, second, third and fourth input states is validly associated with the output signal in its second, third, fourth, and first states, respectively. The circuit further comprises validation means responsive to the input signal and the output signal for detecting, upon a change in the input signal, a valid track crossing by valid association of the present output state with the present input state, and for producing a clocking signal in the presence of the valid association, the state machine means being responsive to the clocking signal to update its output state to the next respective output state.

The signal generating means may be connected to the head for generating a first squarewave signal having one cycle for every four track crossed by the head and a second squarewave signal in quadrature with the first squarewave signal and having one cycle for every four track crossed by the head. In such case, the first and second squarewave signals in combination define an input state cycle for every four track crossed, the input state cycle including four transitions and four distinct input states occurring in repeating sequence and being separated by respective ones of the transitions such that each of the input states has a next following input state associated therewith. The state machine receives the first and second squarewave signals and outputs third and fourth squarewave signals which in combination define an output state cycle including four distinct output states in repeating sequence such that each of the output states has a next following output state associated therewith. The state machine means is initialized to output the second output state in response to the first input state. The validation means receives the first, second, third and fourth squarewave signals for detecting, after a detected transition, a valid association between the the input state presently defined by the first and second squarewave signals and the present output state. The validation means further includes means responsive to the detected valid association for causing the state machine means to update its output.

In another aspect, the validation means generates a valid track crossing signal in response to a detected valid association between the present input and output states occurring within a predetermined time following each transition and further comprises counting means for counting the valid track crossing signals to provide a count of the number of tracks crossed by the head.

In a further development of the present invention, the circuit is incorporated in a system including a record medium which may be, for example, magnetic or optical.

These and other objects, aspects and features of the present invention will become apparent from the following detailed description of a preferred embodiment thereof taken in connection with the accompanying drawings, throughout which like reference numerals denote like elements and parts.

BRIEF DESCRIPTION OF THE DRAWINGS

FIG. 4A is a waveform diagram of a first triangular signal $S_A$ produced in the circuitry of FIG. 3;

FIG. 4B is a waveform diagram of a second triangular signal $S_B$ produced in the circuitry of FIG. 3;

FIG. 4C is a waveform diagram of a first squarewave signal A produced in the circuitry of FIG. 3;

FIG. 4D is a waveform diagram of a second squarewave signal B produced in the circuitry of FIG. 3;

FIG. 4E is a present state table illustrating present states defined by the squarewave signals A and B of FIGS. 4C and 4D;

FIG. 4F is a next state table illustrating next states defined by the squarewave signals A and B of FIGS. 4C and 4D.

DETAILED DESCRIPTION OF THE PREFERRED EMBODIMENT

Figure 1:
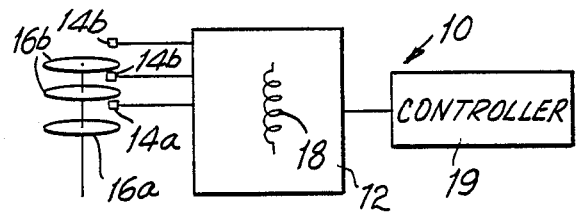
FIG. 1 is a schematic illustration of a hard disk drive system to which the present invention may advantageously be applied.
Figure 2:
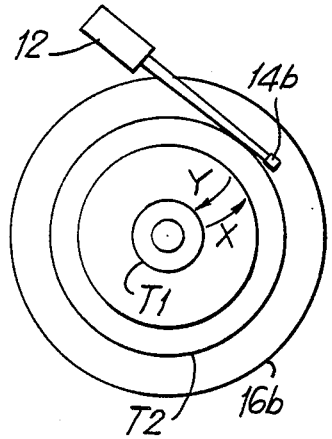
FIG. 2 is a top plan view of a hard disk usable in a hard disk drive system.

Turning now to the drawings and initially to FIGS. 1 and 2 thereof, the present invention may advantageously be applied to a conventional hard disk drive system 10. The following discussion will describe the present invention in the environment of such a hard disk drive system, but it will be understood that the present invention may also be advantageously applied to other disk drive systems, such as floppy or optical disk drive systems, and may be applied in any system in which a record medium has data recorded thereon in a plurality of adjacent tracks and in which a read/write head is movable across the record medium and positionable at a selected one of the tracks for reading or writing data therein.

Hard disk drive system 10 includes a head actuator 12 on which are mounted a servo head 14a and one or more magnetic read/write heads 14b. Servo head 14a is adapted to read a predetermined servo pattern from a dedicated servo disk 16a. Read/write heads 14b are adapted to read from and write on respective surfaces of one or more hard disks 16b. As is conventional and illustrated in FIG. 2, each of disks 16b has information recorded thereon in a plurality of substantially circular, concentric tracks, such as tracks T1 and T2. Head actuator 12 includes a motor, such as a voice coil motor schematically illustrated as coil 18, which supplies the driving power for moving head actuator 12 to position heads 14b over respective desired tracks on disks 16b. In fact, it is servo head 14a reading the servo pattern on servo disk 16a which provides the information on the position of heads 14b. Heads 14b are ganged together with head 14a to overlie corresponding tracks on the respective disks 16.

In accordance with known techniques, coil 18 is responsive to a driving current to rotate head actuator 12 in the clockwise and counterclockwise directions to position the heads 14 at the desired tracks. The following discussion will refer to only a single read/write head 14b and disk 16b, but it will be understood that all read/write heads 14b are moved as a unit in, for example, the track access, or seek, operation described below.

In a forward track access operation, a control signal from a controller 20 causes head actuator 12, driven by coil 18, to rotate in a counterclockwise direction as shown by arrow X in FIG. 2 to move head 14b from a position overlying, for example, track T1 to a position overlying, for example, track T2. In this forward track seek operation, head 14b rapidly skips over the tracks between T1 and T2. Controller 19 may be the computer control for disk drive system 10, while head actuator circuitry controls the generation of the current for coil 18 in response to the control signal. The use of the separate computer control and servo control loop characterizes disk drive system 10 as a "non-embedded" system. An embedded system incorporates the computer control and servo control in a single device. As will be discussed below, while the illustrated embodiment utilizes a non-embedded system, the present invention may be applied to an embedded system also.

In a corresponding reverse track seek operation, controller 19 causes head actuator 12, driven by coil 18, to rotate in a clockwise direction as indicated by arrow Y to move head 14b from its position overlying track T2 to its position in a servo control loop overlying track T1. The present invention is not directed to the construction of heads 14a, 14b or head actuator 12, but rather resides in a circuit for detecting the number of tracks crossed by servo head 14a (and hence crossed by read/write head 14b) during movement thereof across disk 16a, for example, in a forward or reverse track access operation. An object of the present invention is to complete the track seek operation in a minimum amount of time. To this end, advantageously maximum acceleration is applied to head actuator 12 during the first portion of the track seek operation to reach an optimal deceleration curve, and then deceleration is applied along the optimal deceleration curve during the last portion to reach zero velocity over the desired track in the minimum time.

The data recorded in the concentric tracks T1, T2 on disk 16b is conventionally formatted so that each track includes one or more sectors of data, each sector including header data which in turn includes the track identification number of the respective track in which it is recorded. For example, track T1 may be track 100 on disk 16b and has the number "100" recorded therein, while track T2 may be track 200 and has the number "200" recorded therein. Head 14b is adapted to reproduce the header data from the tracks T1 and T2. When head 14b is positioned over track T1, it will reproduce the header data and read the track identification number 100 therefrom. Similarly, when head 14b is positioned over track T2, it will read the track identification number 200 from the header data recorded therein.

In a track access or seek operation, when the disk drive system 10 is instructed to move read/write head 14b to overlie track 200, head actuator 12 moves servo head 14a across disk 16a until the required number of tracks have been crossed. One way in which disk drive system 10 may accurately move head 14b is by reproducing the header data in each track crossed, extracting the track number from the header data and comparing the extracted track number with the desired track number. This, however, is disadvantageous in view of the time required to reproduce the header data, extract the track number information and perform the comparison. It is preferable to count the number of tracks crossed, without separately identifying each individual track. That is, at the start of any track seek operation, head 14b will be positioned over some track, for example track T1, which is track 100. If the disk drive system 10 receives an instruction to access track 200, it can immediately compute that it is necessary to cross one hundred tracks to reach track 200 from track 100. Therefore, head actuator 12 will apply the optimal acceleration/deceleration in the clockwise or counterclockwise direction, as appropriate, for 100 tracks to reach zero velocity over the desired track 200. It is not necessary to separately identify each track crossed by its track number as recorded in the header data; it is only necessary to accurately detect each track crossed and keep a count of the number of tracks crossed.

If an inaccurate count is made, so that, for example, head 14b comes to rest over track 198, rather than over track 200, head actuator 12 must perform at least a short track jump to move head 14b from track 198 to track 200. Indeed, some conventional disk drive systems will respond to an erroneous track access by returning to track 0 and reattempting the seek. The time required for any such correction significantly increases the total time for the track seek. It would therefore be highly advantageous to produce an accurate count of the number of tracks crossed so as minimize the time required for the track access operation.

Figure 3:
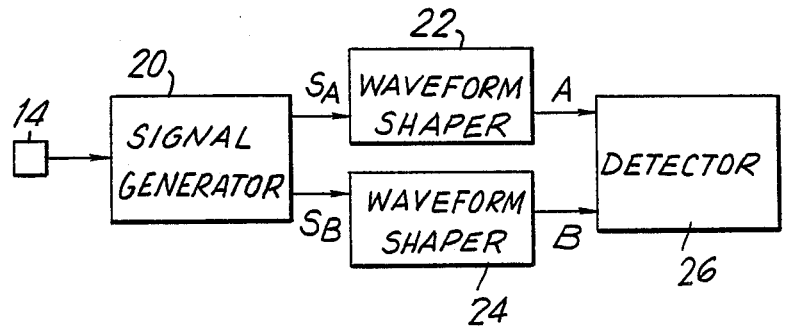
FIG. 3 is a block diagram of a preferred embodiment of the present invention as incorporated in the system of FIG. 1.

In disk drive system 10, it is servo head 14a which detects the crossing of a track, or the position of read/write head 14b relative to the track, from the servo pattern recorded on servo disk 16a. Read/write head 14b does not reproduce any data during the track access operation. The servo pattern is conventionally recorded such that a scanning servo head will produce two generally triangular signals $S_A$ and $S_B$. As shown in FIG. 3, the signal detected by servo head 14a is supplied to a signal generating circuit 20, which may include, for example, amplification/demodulation circuitry. Circuit 20 produces the first generally triangular signal $S_A$, illustrated in FIG. 4A, and simultaneously produces the second generally triangular signal $S_B$ (FIG. 4B) in quadrature with the first generally triangular signal $S_A$. Thus, triangular signal $S_B$ is 90° out of phase with triangular signal $S_A$. The generation of these two triangular signals $S_A$, $S_B$ by a magnetic head in a disk drive system and their use in accurately positioning a head read/write 14b with respect to a desired track is well known in the art and will not be further described herein. Furthermore, it is known to use triangular signals $S_A$, $S_B$ to count the tracks crossed by servo head 14a. However, the surface of servo disk 16a may have defects which produce distortions or "glitches" in triangular signals $S_A$, $S_B$. Such glitches may in turn distort the track counting process, resulting in an inaccurate count. It is a purpose of the present invention to suppress the effect of such glitches and to provide an accurate count of the tracks crossed.

In accordance with the present invention, each of the triangular signals $S_A$ and $S_B$ may be provided to respective waveform shaping circuits 22, 24 (FIG. 3) to be converted into corresponding digital squarewave signals A or B, respectively, using, for example, comparators or zero crossing detectors. Signals A and B are respectively illustrated in FIGS. 4C and 4D. In practicality, the peaks and troughs of triangular signals $S_A$, $S_B$ deviate from linearity, so that it is preferable to use only the linear intermediate potions thereof to define signals A and B. This will result only in a slight phase shift of both signals A and B and does not affect the apparatus or method in accordance with the present invention. Signals A and B are fed to a novel detector circuit 26 which, in accordance with the present invention, accurately detects and counts the number of tracks crossed by head 14 during a track access operation.

Each of signals A and B, like each of signals $S_A$ and $S_B$, has one cycle for every four tracks crossed and two transitions within each cycle from digital level 0 to digital level 1 and then back from digital level 1 to digital level 0. Taken in combination, signals A and B together define a composite cycle $C_n$ for every four tracks crossed, each such composite cycle $C_n$ having four transitions therein and four distinct, ordered states established by the values of signals A and B in combination. FIG. 4D illustrates the timing of each composite cycle $C_n$ and the time periods t1, t2, t3 and t4 for each of the four states. As shown in FIG. 4E, each of the four distinct states may be represented by the values of the signals A and B during such state. Thus, the first input state of the first cycle $C_1$ is represented by the pair (0,0), with the value of signal A being taken as the first element of the pair and the value of signal B being taken as the second element of the pair. Similarly, the second state of cycle $C_1$ is represented by the pair (0,1), the third state of cycle $C_1$ is represented by the pair (1,1) and the fourth state of cycle $C_1$ is represented by the pair (1,0). A transition in one of signals A and B occurs between each input state in cycle $C_1$. It will further be seen that following the transition ending the fourth state of the cycle $C_1$, a new cycle $C_2$ begins with a first state identical to the first state of cycle $C_1$, and which may be represented again by the pair (0,0). Thus, the two signals A and B in combination define a cycle having first, second, third and fourth ordered states in repeating sequence.

The above-described states illustrated in FIG. 4E are present states, that is, they are states indicative of the present values of signals A and B. Because of the repeating sequence of the four states in order, each present state has a unique next following state associated therewith. Thus, state (0,1) is the next following state associated with present state (0,0), state (1,1) is the next following state associated with present state (0,1), state (1,0) is the next following state associated with present state (1,1) and state (0,0) is the next following state associated with present state (1,0). These next following states are illustrated in FIG. 4F directly below their associated present states.

It will further be seen that if the two values defining each state are taken as the upper and lower bits of a binary number, the sequence of states defines a modulo-4 gray code: 00, 01, 11, 10.

Figure 5:
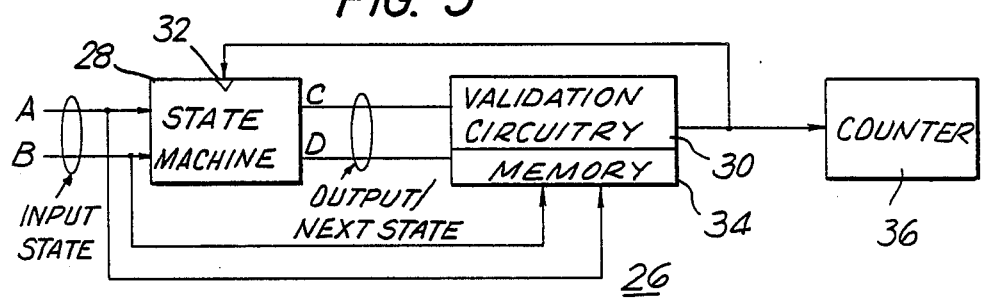
FIG. 5 is a block diagram of a circuit in the preferred embodiment of the present invention.

In accordance with the present invention, squarewave signals A and B are used by detector circuit 26 in a state machine operation to detect the number of tracks crossed by head 14a as it moves across disk 16a. Detector circuit 26 is illustrated in FIG. 5, in which signals A and B are fed to both a state machine 28 and validation circuitry 30. Signals A and B define a present input state received by both state machine 28 and validation circuitry 30. State machine 26 outputs third and fourth square wave signals C and D which in combination define an output state of state machine 28. Signal D is in quadrature with signal C in the same phase relation as signal B is in quadrature with signal A, so that the values of signals C and D define successively the same four states (0,0), (0,1), (1,1), (1,0) as the input states defined by signals A and B. State machine 28 is initialized with respect to signals A and B to output signals C and D in an output state which is the expected next following state for the present input state represented by signals A and B. This may be achieved, for example, by initializing state machine 28 to output state (0,1) in response to an input state of (0,0), and by updating the output of state machine 28 to output the next state in sequence from its current output when a valid new input state is detected. The presence of a new input state is indicated by a transition in one of signals A and B, and in the present invention state machine 28 normally responds to a valid transition in its input state to update its output. For example, when the present input state is (0,0) and signal B has a transition from digital level 0 to digital level 1, so that the present input state changes to (0,1), the output of state machine 28 is updated from (0,1) to (1,1) by changing the value of signal C from digital level 0 to digital level 1. Advantageously, state machine 28 may be embodied in a gray code modulo-4 counter. Such counters are capable of detecting transitions in their input by the use of, for example, flip-flops. State machine 28 also includes a clock input 32 and updates its output in response to a clocking signal received at clock input 32. Other circuitry having such functions may of course be substituted in place of the modulo-4 counter.

Validation circuitry 30 functions to generate the clocking signal only when a detected transition is identified as a valid transition to a new input state and not as a glitch. To this end, validation circuitry 30 receives all four squarewave signals A, B, C, D. Consequently, it receives both the present state (indicated by signals A and B in combination) and the expected next state for the present state (signal C and D in combination). This expected next state (C,D) is stored in a memory 34 in validation circuitry 30.

Suppose that the present input state is (0,0) and the present output state is (0,1), as just prior to point a in FIG. 4C. The present output state is stored in memory 34 and is the correct next expected state for the present input state. Suppose now that a transition is detected at point a in one of signals A and B. If it is a valid transition, it will occur in signal B from 0 to 1 and the changed level will endure for half a cycle. The present state will go to (0,1) after the transition is detected and will remain there.

Validation circuitry 30 then compares the present state, i.e. signals A and B, with the state stored in memory 34. Since this transition is valid, the stored next expected state (0,1) is the proper associated state for the present input state (0,1). Indeed, in the illustrated embodiment the two compared states are identical when the transition is valid, and such identity is easily detected by, for example, two comparator or exclusive-or gates. Upon the detection of a valid transition, validation circuitry 30 emits a clocking signal to clock input 32 of state machine 28. State machine 28 then updates its output state to the next state in sequence, i.e. here signal C is changed from 0 to 1 so that the output state is now (1,1), which is the correct next expected state for the new present input state (0,1). The new next expected state is stored in memory 34 and the next transition is awaited.

Since the transition was detected as valid, the clocking signal is indicative of a track crossed. The clocking signal may therefore be regarded as a valid track crossing signal and be supplied to a counter 36. The count in counter 36 equals the number of tracks crossed and is used by head actuator 12 to properly position read/write head 14b.

However, it may happen that a defect in the surface of servo disk 16a, or some other error, will cause a momentary glitch or noise spike in one of signals A or B. Such a glitch is illustrated at point b in FIG. 4C before point a. If such a glitch occurs at point b, the present input state will briefly go to state (1,0) but will then return to state (0,0). Validation circuitry again compares the present output state with the present input state. Now, however at the time of comparison, the present input state is (0,0) and the present output state (the next expected state stored in memory 34) is (1,0), which is not the proper associated state for the present input state. Validation circuitry 30 recognizes this by the absence of identity between the present input state and the stored next expected state and therefore identifies the supposed transition as a glitch. As a result, validation circuitry 30 will not emit the clocking signal as a valid track crossing indication, so that state machine 28 does not update its output state and the total count of tracks crossed in counter 36 will not be increased.

Thus, the total number of tracks detected will be correct, even if the detected transitions include glitches. Since this process is taking place as the head 14a is rapidly moved across servo disk 16a, it does not matter that a count for each track does not necessarily occur exactly when a track is crossed. The primary consideration is whether the number of tracks is accurately counted and the present invention insures that this is so. Thus, the present invention does not suppress the glitches or refuse to count them, but rather suppresses their effect.

In accordance with the present invention, a simple and elegant circuit is provided which accurately detects the number of tracks crossed by a head using a state machine operation and suppressing the effect of any noise glitches which may occur.

Although the present invention has been described in connection with a single preferred embodiment, it will be apparent to those of ordinary skill in the art that many changes and modifications may be effected therein without departing from the spirit and scope of the present invention. For example, the state machine may update its output state in response to the transition, valid or glitch, and then compensate for counting a glitch by refusing to count or update in response to the next transition, valid or glitch. Also, the present invention may be used with an embedded servo design wherein servo signals are recorded on the respective data disk 16b and read by data heads 14b, thereby obviating dedicated servo disk 16a and servo head 14a. Additionally, coil 18 may be included in a linear motor to drive actuator 12 in the linear direction. Therefore, the spirit and scope of the present invention is to be determined by reference to the appended claims.

What is claimed is:

1. In a disk drive system including a disk having data recorded thereon in a plurality of concentric, substantially circular tracks and a head movable across said disk and positionable at a selected one of said tracks, a circuit for detecting a number of tracks crossed by said head during movement thereof across said disk, said circuit comprising:

signal generating means connected to said head for generating an input signal having plural sequential ordered input states indicative of respective tracks crossed;

state machine means for producing an output signal having plural sequential ordered output states, each of said input states being validly associated with a respective one of said output states;

validation means responsive to said input signal and said output signal for detecting, upon a change in said input signal, a valid track crossing upon valid association of the present output state with the present input state and producing a track crossing signal in response thereto: and means for registering said track crossing signal, to update the number of tracks crossed by said head.

2. In a disk drive system including a disk having data recorded thereon in a plurality of concentric, substantially circular tracks and a magnetic head movable across said disk and positionable over a selected one of said tracks for reading the data recorded therein, a circuit for detecting a number of tracks crossed by said head during movement thereof across said disk, said circuit comprising:

signal generating means connected to said head for generating a first squarewave signal having one cycle for every four track crossed by said head and a second squarewave signal in quadrature with said first squarewave signal and having one cycle for every four tracks crossed by said head;

said first and second squarewave signals in combination defining an input state cycle for each said track crossed, said input state cycle including four transitions and four distinct input states occurring in repeating sequence and being separated by respective ones of said transitions, such that each of said input states has a next following input state associated therewith;

state machine means receiving said first and second squarewave signals and outputting third and fourth squarewave signals which in combination define an output state cycle including four distinct output states in repeating sequence such that each of said output states has a next following output state associated therewith;

each of said input states being validly associated with a respective one of said output states in sequence; and validation means receiving said first, second, third and fourth squarewave signals for detecting, following each said transition, a valid association between the input state presently defined by said first and second squarewave signals and the present output state;

said validation means including means responsive to said valid association for causing said state machine means to update its output.

3. A disk drive system according to claim 2, wherein said first, second, third and fourth squarewave signals are all digital signals.

4. A disk drive system according to claim 2, wherein said state machine means includes modulo-4 counter means.

5. A disk drive system according to claim 4, wherein said modulo-4 counter means is a gray-code counter means.

6. A disk drive system according to claim 5, wherein said first and second squarewave signals are input to said modulo-4 counter means as upper and lower bits, respectively, so that said first, second, third and fourth input states correspond to (0,0), (0,1), (1,1) and (1,0), respectively, and wherein said third and fourth squarewave signals are output from said modulo-4 counter means as upper and lower bits, respectively, so that said first, second, third and fourth output states correspond to (0,1), (1,1), (1,0) and (0,0) respectively.

7. A disk drive system according to claim 6 wherein said validation means detects said valid association by comparing the upper and lower bits of said input state with the upper and lower bits of said output state.

8. A disk drive system according to claim 7, wherein said validation means includes memory means for storing said upper and lower bits of said output state.

9. A disk drive system according to claim 2, wherein said validation means includes means for generating a clocking signal in response to detection of said valid association, wherein said state machine means includes a clocking input for receiving said clocking signal, and wherein said state machine means updates its output state in response to said clocking signal.

10. A disk drive system according to claim 2, wherein said validation means generates a valid track signal in response to a detected valid association between said present input state and said present output state a predetermined time after each said transition, and further comprising counting means for counting said valid track signals to provide a count of the number of tracks crossed by said head.

11. In a system including a record medium having a plurality of adjacent data tracks and a head movable across said record medium and positionable at a selected one of said tracks, a circuit for detecting a number of tracks crossed by said head during movement across said record medium, said circuit comprising:

signal generating means connected to said head for generating an input signal having first, second, third and fourth ordered input states for every four tracks crossed;

state machine means for outputting an output signal having first, second, third and fourth ordered output states, each said input states being validly associated with a respective one of the output states; and validation means responsive to said input signal and said output signal for detecting a valid track crossing upon valid association of the present output state with the present input state after a change in the input signal, and producing a clocking signal in the presence of said valid association;

said state machine means being responsive to said clocking signal to update its output state.

12. A method usable in a system including a record medium having a plurality of adjacent data tracks and a head movable across said record medium and positionable at a selected one of said tracks, said method detecting a number of tracks crossed by said head during movement thereof across said record medium, said method comprising the steps of:

generating, in response to signals detected by said head from said tracks, an input signal having first, second, third and fourth ordered input states for every four tracks crossed;

generating an output signal having first, second, third and fourth output states, each of said output states being validly associated with a respective input state;

detecting a change in said input state;

detecting a valid track crossing in response to a valid association of the present output state with the present input state; and changing said output signal to the next output state in the presence of a detected valid association.

13. In a system including a record medium having a plurality of adjacent data tracks and a head movable across said record medium and positionable at a selected one of said tracks, a circuit for detecting a valid track-crossing by said head during movement across said record medium, said circuit comprising:

signal generating means connected to said head for generating an input signal having a predetermined plurality of ordered input states as successive tracks are crossed, said input signal repeating said predetermined plurality of input states in identical order for successive tracks crossed;

state machine means for outputting an output signal having said predetermined plurality of ordered output states, each of said output states being validly associated with a respective one of said input states; and validation means responsive to said input signal and said output signal for detecting, upon a change in said input signal, a valid track crossing upon matching of the present output state with the present input state, and producing a clocking signal in the presence of said matching;

said state machine means being responsive to said clocking signal to update its output state.

* * * * *